UNITED STATES PATENT OFFICE.

BRUNO RICHARD SEIFERT, OF RADEBEUL, GERMANY, ASSIGNOR TO THE CHEMISCHE FABRIK VON HEYDEN, GESELLSCHAFT MIT BESCHRÄNKTER HAFTUNG, OF SAME PLACE.

OXYPHENYL-GUANIDIN AND PROCESS OF MAKING SAME.

SPECIFICATION forming part of Letters Patent No. 605,977, dated June 21, 1898.

Application filed November 16, 1897. Serial No. 658,753. (Specimens.)

*To all whom it may concern:*

Be it known that I, BRUNO RICHARD SEIFERT, of Radebeul, near Dresden, in the Kingdom of Saxony, German Empire, have invented a new and useful Improvement in Oxyphenyl-Guanidins and their Derivatives and in the Process of Producing the Same, of which the following is a specification.

My invention refers to the manufacture of the aromatic guanidins of the formula

in which R and R'' represent hydrogen or the univalent residue of a fatty or aromatic compound, and R' represents hydrogen or alkyl or alkylene. This new class of substances produced by my process is of special industrial importance by reason of its capability of being employed as an anesthetic. Not all oxyphenyl-guanidins, but only the class of substances characterized by the above formula, possesses this industrial value. These substances possess also a germicidal action in addition to their anesthetic action.

In the following example there is particularly described the manufacture of paratriethoxy phenyl-guanidin.

Example: (a) Sulfid of carbon and paraamidophenetol are mixed together approximately in the proportion of one to two. The latter substance may be previously diluted with about the same or double the volume of alcohol or ether. The mixture sets quickly with the precipitation of a solid whitish-yellow substance, which after being washed in ether melts at about 70° centigrade. This substance may be redecomposed back into sulfid of carbon and amidophenetol by boiling with water or treating with acid. There also remains a certain residual amount of diethoxydiphenyl-thio-urea $CS(NHC_6H_4OC_2H_5)_2$, which is either contained originally in the primary substance or is formed as a by-product of the decomposition. The substance, which is readily decomposable and which is produced by mixing sulfid of carbon and paraphenetidin, is therefore probably the salt

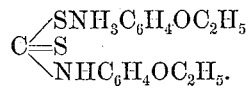

It may be mixed with some diethoxydiphenyl-thio-urea.

(b) On diluting the phenetidin still further with ether, alchohol, or other neutral solvent then the substance specified in *a* does not separate out at once on the addition of $CS_2$, but diethoxydiphenyl-thio-urea separates out after some time, the production of which is fully described in the lapsed German patent, No. 66,550.

(c) For the purpose of producing the triparaethoxyphenyl-guanidin either diethoxydiphenyl-thio-urea produced in any way whatever or the substance produced according to *a* from carbon disulfid and paraphenetidin is desulfurized by means of lead oxid in the presence of phenetidin.

The reactions which take place in both cases may probably be represented by the following equations:

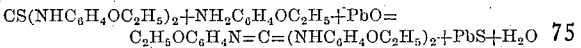

and

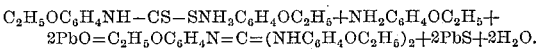

The reaction may be carried out in the following manner: Any one of the products of reaction resulting from carbon disulfid and paraphenetidin is mixed in hot alcohol with one equivalent of paraphenetidin, and is then desulfurized with an excess of lead oxid or other desulfurizing agent until a filtered sample produces no longer any blackening with an addition of lead oxid. Separation is effected by filtering hot from the lead sulfid and the alcohol is evaporated. The oily residue is dissolved in hot dilute hydrochloric acid. This solution is treated, when necessary, with animal charcoal, and after filtration and cooling colorless coarse needle crystals are separated out. These consist of hydrochlorate of triparaethoxyphenyl-guanidin having a melting-point of 197° centigrade.

The air-dried substance has yielded the following values:

| Calculated for $C_{25}N_{29}.N_3O_3HCl+aq.$ | Found. |
|---|---|
| C = 63.33 per cent. | C = 63.15 |
| H = 6.76 per cent. | H = 6.70 |

The extra-dried substance has yielded the following values:

| Calculated for $C_{25}H_{29}N_3O_3HCl.$ | Found. |
|---|---|
| C = 65.86 per cent. | C = 65.92 |
| N = 9.22 per cent. | N = 9.40 |
| Cl = 7.79 per cent. | Cl = 7.85 |

On being heated to 110° centigrade the glassy crystalline salt assumes an efflorescent aspect. On mixing an aqueous solution of the same with alkali flakes are precipitated, which when slightly heated melt together to form a colorless oil which dissolves in hydrochloric acid with regeneration of the chlorin hydrate, but is readily soluble in alcohol, ether, and benzene. The separated oil sets in cooling and in this form has a melting-point of about 55° centigrade. Attempts at acetylization were not successful.

(d) If instead of paraphenetidin there are employed the isomers and homologues

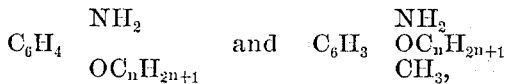

there are obtained the homologues of triethoxyphenyl-guanidin, which have a general resemblance to the same as regards properties.

The hydrochlorate of guanidin $$(CH_3OC_6H_4NH)_2=C=NC_6H_4OCH_3HCl$$

produced from paraänisidin has a melting-point of 201° centigrade. From $$C_2H_5OC_7H_6NH_2$$

there is obtained the guanidin

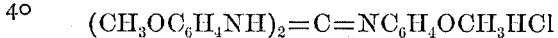

(e) If in the process of production described under c there is used thio-carbaminate salt or thio-ureas derived from aromatic bases, which are different from the amidophenol body added in the desulfurization, then mixed guanidins are obtained. If, for instance, in the example described under c, instead of phenetidin the paraänisidin be employed, there is produced the mixed guanidin

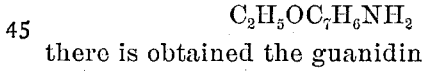

having a melting-point of 182° centigrade. If, on the contrary, in this example instead of diphenetol-thio-urea there be used diparaanisol-thio-urea or diphenyl-thio-urea, the mixed guanidins

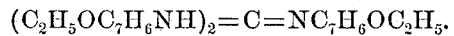

having a melting-point of 176° centigrade, will be produced, and $$(C_6H_5NH)_2CNC_6H_4OC_2H_5),$$

an oil whose hydrochlorate salt is soluble in water, crystallizes difficultly and melts in the anhydric state at 170° centigrade.

(f) Instead of lead oxid any other desired desulfurizing agents may be employed—for instance, other metallic oxides or hydrated oxids; also, metallic chlorids, such as, for instance, $HgCl_2$ or the compounds of $HgCl_2$ and phenetidin ($Cl-Hg-NHC_6H_4OC_2H_5$ or of similar constitution); also, metallic powders (copper, aluminium, &c.) may, as is well known, be used as agents for destroying sulfureted hydrogen in the manufacture of guanidin.

(g) Alcohol may be replaced by other neutral solvents or a solvent may be wholly dispensed with. In the latter case there is preferably employed as a desulfurizing agent a metallic powder—for example, copper powder—and the mixture thereof with thio-urea is heated with the omission of the addition of the base. Therefore in the manufacture of triphenetol-guanidin without a solvent the addition of amidophenetol is omitted and the diphenetol-thio-urea is simply melted with the metal powder—for example, reduced copper—and the melt is boiled with dilute hydrochloric acid. The solution when cold yields the crystals (already described under c) of hydrochlorate of triphenetol-guanidin. Even the addition of the metallic powder may be omitted, because the great supply of heat acts of itself as a desulfurizing agent. For instance, it is sufficient to heat the diphenetol-thio-urea by itself to about 150° to 200° centigrade; but this variation gives a less yield.

(h) Instead of thio-urea the corresponding urea can be also employed. Then a dehydration takes place instead of a desulfurization. For example, on heating five parts of diphenetol-urea with 2.3 parts of phenetidin and one part of phosphorous trichlorid, pentachlorid, or oxychlorid, or with the corresponding quantity of phorphorous trioxid or pentoxid, or metaphosphoric acid to about 170° centigrade, and if the melt when cold is dissolved in hot dilute hydrochloric acid the hydrochlorate of triphenetol-guanidin crystallizes out of the solution. Instead of dehydrating chlorids or anhydrids caustic alkalies or alkali alcoholates may be used as dehydrating agents. If, for example, five parts of diphenetol-urea be heated with one part of powdered sodium hydroöxid or sodium ethylate or without any addition to melting-point for some time and the cooled melt is dissolved in hot dilute hydrochloric acid, then when the solution is cold the hydrochlorate of triphenetol-guanidin crystallizes out.

(i) All the hereinbefore-described variations in the mode of manufacture are based, obviously, on the intermediate formation of carbodiïmids. The process does not take place, as specified under c, in one stage, but in two stages, the sum of which is equal to the equation specified under c.

1. $CS(NHC_6H_4OC_2H_5)_2 + PbO = C(NC_6H_4OC_2H_5)_2 + PbS + H_2O$.
2. $C(NC_6H_4OC_2H_5)_2 + NH_2C_6H_4OC_2H_5 = C_2H_5OC_6H_4NC(NHC_6H_4OC_2H_5)_2$.

The reaction may be effected in these separate stages; but then in desulfurization a solvent must be used which is neutral to the extremely reactive carbodiïmid—such as, for instance, benzene. For example, diphenetolthio-urea is dissolved in benzene, and this solution is heated with lead oxid until the desulfurization is completed, filtered, and gaseous hydrochloric acid is passed into the filtrate. The hydrochlorate of carbodiphenetoldiïmid then separates out in the form of white crystals. These melt at 190° to 200° centigrade with decomposition and form with alcohol or water, especially in the presence of alkalies, very rapidly the corresponding urea, according to the equation:

$C(=NC_6H_4OC_2H_5)_2 + H_2O = CO(-NHC_6H_4OC_2H_5)_2$;

but the carbodiïmid combines with bases to form guanidin and with paraphenetidin to form triphenetol-guanidin, as specified by the above-stated stage No. 2.

In the substitution of thio-urea by the corresponding urea, as stated under h, water is split off in the first stage and carbodiïmid is also formed from the urea, which carbodiïmid combines in the second stage with the added phenetidin or with the phenetidin produced by the action of alkali upon another portion of the urea to form guanidin.

All the hereinbefore-described variations are thus really only more or less complicated modes of carrying out the theoretically most simple mode of production—viz., the simple melting or dissolving together of a carbodiïmid with an amidophenol body.

In effecting the reaction in the said two stages simple as well as mixed guanidins can be produced. As an example of simple guanidins, the production of triphenetyl-guanidin by simply bringing together $C=(NC_6H_4OC_2H_5)_2$ and amidophenetol; as an example of mixed guanidins, the production of phenetoldianisol-guanidin by bringing together $C=(NC_6H_4OCH_3)_2$ and amidophenetol.

According to the process described above—viz., a to i—I have obtained the following new substances:

Triphenetyl-guanidin, (ortho, para, and meta,)

$C_2H_5OC_6H_4N=C=(NHC_6H_4OC_2H_5)_2$.

Trianisyl-guanidin, (ortho, para, and meta,)

$CH_3OC_6H_4N=C=(NHC_6H_4OCH_3)_2$.

Trihomophenetyl-guanidin, $C_2H_5OC_7H_6N=C=(NHC_7H_6OC_2H_5)_2$.

Tripropylphenyl-guanidin, tributylphenyl-guanidin, triamylphenyl-guanidin, and triethylenephenyl-guanidin, $ROC_6H_4N=C=(NHC_6H_4OR)_2$, in which R represents propyl, butyl, ethylene, isopropyl, isobutyl, and isoamyl.

Triphenol-guanidin, $HOC_6H_4=C=(NHC_6H_4OH)_2$.

Diphenetylmonophenol-guanidin, (phenetyl, including ortho, meta, and para:)

$HOC_6H_4N=C=(NHC_6H_4OC_2H_5)_2$.

Diphenetylmonoanisyl-guanidin, (in which phenetyl and anisyl include ortho, meta, and para:)

$CH_3OC_6H_4N=C=(NHC_6H_4OC_2H_5)_2$.

Dianisylmonophenol-guanidin, (anisyl, including ortho, meta, and para:)

$HOC_6H_4N=C=(NHC_6H_4OCH_3)_2$.

Dianisylmonophenetyl-guanidin, (in which anisyl and phenetyl include ortho, meta, and para:)

$C_2H_5OC_6H_4N=C=(NHC_6H_4OCH_3)_2$.

Diphenylmonoanisyl-guanidin, $CH_3OC_6H_4N=C=(NHC_6H_5)_2$, (anisyl, including ortho, meta, and para.)

Diphenylmonophenetyl-guanidin, $C_2H_5OC_6H_4N=C=(NHC_6H_5)_2$, (phenetyl, including ortho, meta, and para.)

Ditolylmonoanisyl-guanidin, $CH_3OC_6H_4N=C=(NHC_7H_7)_2$, (anisyl, including ortho, meta, and para.)

Ditolylmonophenetyl-guanidin, $C_2H_5OC_6H_4N=C=(NHC_7H_7)_2$, (phenetyl, including ortho, meta, and para.)

Diphenetyl-guanidin, $C_2H_5OC_6H_4N=C-NH_2-NHC_6H_4OC_2H_5$.

What I claim as my invention is—

1. The process herein described for the production of oxyphenyl-guanidins of the formula $$C{\overset{\displaystyle NHR}{\underset{\displaystyle NHR''}{=NC_6H_4OR'}}}$$

in which R and R'' represent hydrogen or the univalent residue of a fatty or aromatic compound, and R' hydrogen or alkyl or alkylene, said process consisting in the addition of a carbodiïmid to an amidophenol $NH_2C_6H_4OR'$, in which R' represents hydrogen, alkyl or alkylene.

2. The process of making oxyphenyl-guanidins of the formula $$C{\overset{\displaystyle NHR}{\underset{\displaystyle NHR''}{=NC_6H_4OR'}}}$$

in which R and R'' represent hydrogen or the univalent residue of a fatty or aromatic compound, and R' represents hydrogen or alkyl or which consists in subjecting the reaction products from carbon bisulfid and amidophenol bodies to the action of desulfurizing agents in the presence of aromatic amido bodies, substantially as herein described.

3. The oxyphenyl-guanidins herein described having the formula

in which R and R'' represent hydrogen or the univalent residue of a fatty or aromatic compound, and R' represents hydrogen or alkyl or alkylene, and adapted to cause anesthesia, their chlorids forming white crystalline powders soluble in water and alcohol, from which solutions alkaline lyes precipitate free oxyphenyl-guanidins as oily substances insoluble in water and soon becoming solid.

In testimony that I claim the foregoing as my invention I have signed my name in presence of two subscribing witnesses.

BRUNO RICHARD SEIFERT.

Witnesses:
CARL HEINRICH KNOOP,
HERNANDO DE SOTO.